Inventor
R.C. Sanborn
By Watson E. Coleman
Attorney

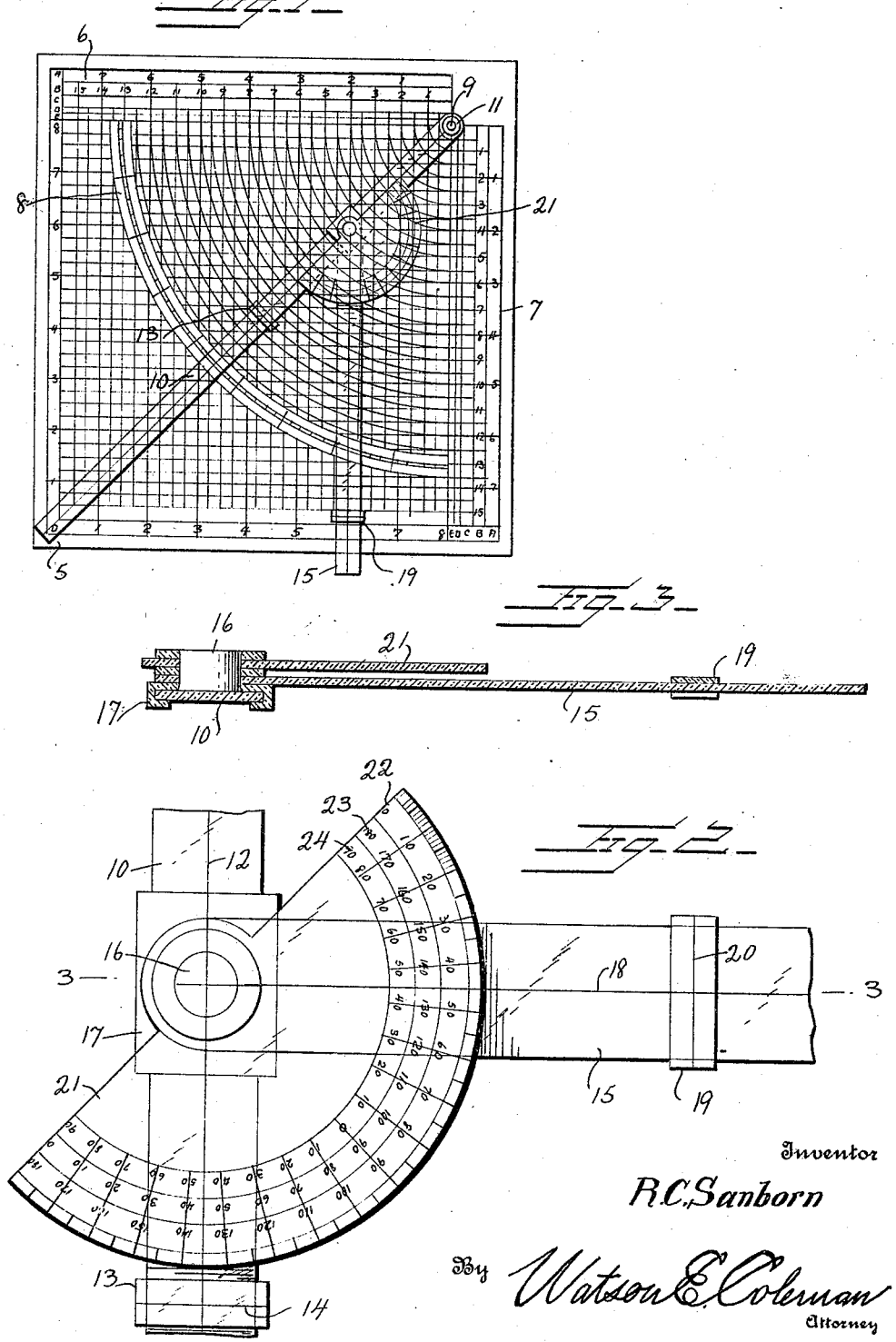

UNITED STATES PATENT OFFICE.

RALPH C. SANBORN, OF BRIARCLIFF MANOR, NEW YORK, ASSIGNOR OF FIFTY PER CENT. TO PETER J. McKENNA, OF BRIARCLIFF MANOR, NEW YORK.

MATHEMATICAL INSTRUMENT.

1,310,547. Specification of Letters Patent. Patented July 22, 1919.

Application filed November 14, 1918. Serial No. 262,470.

*To all whom it may concern:*

Be it known that I, RALPH C. SANBORN, a citizen of the United States, residing at Briarcliff Manor, in the county of Westchester and State of New York, have invented certain new and useful Improvements in Mathematical Instruments, of which the following is a specification, reference being had to the accompanying drawings.

This invention relates to mathematical instruments, and has for its primary object to provide a very simple and easily operable device for determining angles.

It is another and more particular object of the invention to provide a device for the above purpose embodying a chart having linear scales delineated thereon extending at right angles to each other and a protractor scale between the linear scales, a pair of angle finding arms, one of which is slidable on the other, the latter arm being pivotally mounted upon the chart, a protractor carried by the sliding arm, and an index element adjustable on each of said arms.

It is also a further general object of my invention to provide a device for the above purpose which is simple and inexpensive in its construction, accurate and reliable in practical use, and which will relieve the user of the necessity of making numerous mental calculations.

With the above and other objects in view, the invention consists in the improved construction, combination and relative arrangement of the several parts as will be hereinafter more fully described, subsequently claimed and illustrated in the accompanying drawings in which similar reference characters designate corresponding parts throughout the several views, and wherein:—

Figure 1 is a plan view of the device showing the same assembled and arranged for use;

Fig. 2 is a plan view on an enlarged scale of the two adjustable arms of the sliding protractor;

Fig. 3 is a section taken on the line 3—3 of Fig. 2;

Figure 4:
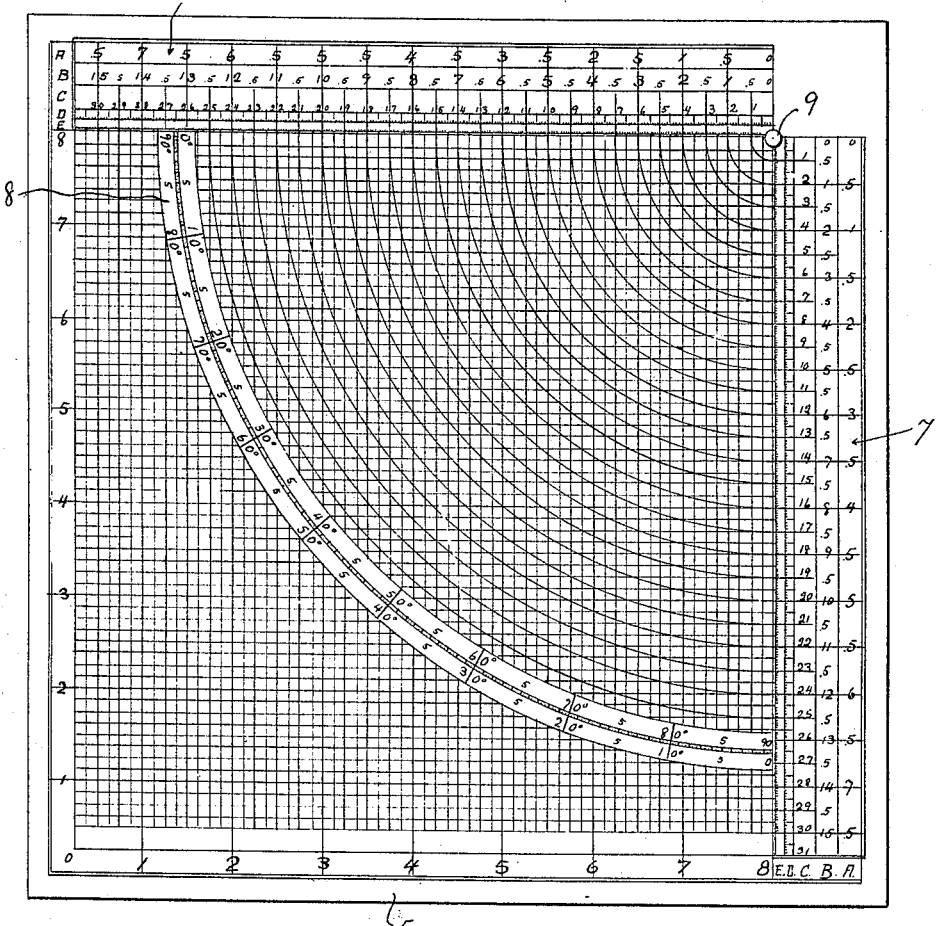
Fig. 4 is a plan view of the chart on an enlarged scale.

Referring in detail to the drawings, 5 designates the chart of the calculator, which may be printed, engraved, or otherwise delineated upon an enameled metal surface, oxylonite or bristol board. In the latter case, the chart is preferably covered with glass. At the top and right hand side of the chart, two series of scales, indicated at 6 and 7 respectively, are provided, there preferably being five different series of graduations on each scale, designated A, B, C, D and E respectively. The scales D are graduated to the tenth part of an inch and the graduation lines are extended from each scale D in intersecting relation entirely across the chart. In order to avoid confusion, the unit lines of these scales are preferably printed in red, while the tenth graduation lines are printed black, and the five-tenths lines are printed blue.

Extending between the two scales 6 and 7 is a protractor scale graduated in each direction from 0° to 90°. Each degree is preferably graduated into divisions of twenty seconds each. This protractor scale is preferably located at the extremities of the scales 6 and 7 so as to leave a clear square of graduations, thus eliminating confusion. I do not wish to be limited, however, to the exact location of this scale 8.

Where the two sets of scales 6 and 7 intersect at the upper right hand corner of the chart is a pivot pin 9 fixed in the chart. On this pin one end of an arm 10 which I term the hypotenuse arm is loosely pivoted. A clamping nut 11 engages the pivot pin 9 so that the arm 10 may be clamped in any adjusted position or its too free swinging movement prevented. The arm 10 is of suitable transparent material and has a longitudinally extending hair line designated 12. On this arm is a transparent slide member 13 having a hair line designated 14 intersecting the line 12 on arm 10. A second transparent arm 15 is loosely engaged with a pivot 16 fixed in a slide 17 freely movable on the arm 10. This arm 15 is provided with a longitudinally extending hair line 18 and with a slide member 19 having a hair line 20 intersecting the line 18. A protractor scale 21 divided into degrees is loosely engaged upon the pivot 16 and this scale, which is also of transparent material, is provided with three separate degree scales, designated 22, 23, and 24 respectively, the purpose of which will be apparent.

In the use of the device, let it be assumed, for example, that it is desired to find the length of the hypotenuse side of a right angle whose base is equal to 6 and whose altitude equals 8. The graduation line 6 is first located on the top of the scale and for convenience, we will use the scale designated B. This line 6 is followed downwardly to the point where it crosses the graduation line 8 extending from the scale B at the right hand side of the chart. The slide member 13 on the hypotenuse arm 10 is then moved outwardly on said arm until its hair line crosses the junction point of the graduation lines 6 and 8, it being of course understood that the hypotenuse arm is positioned with its longitudinal hair line 12 extending through this point. The hypotenuse arm is now swung to the right over the scale B and it is noted that the hair line of the slide 13 is disposed exactly upon the graduation 10 on this scale, thus indicating that the hypotenuse of the angle is equal to 10. More complicated problems can also be as readily solved.

From the foregoing description, taken in connection with the accompanying drawings, the construction and manner of use of my improved instrument will be readily understood. The device may be employed for solving many mathematical problems in addition to those above referred to and it is also apparent that the chart, as well as the several other parts used in connection therewith, may be constructed in various sizes. I have herein indicated a certain arrangement of the scale graduations, but it will be apparent that these series of graduations may be either increased or reduced in number. In view of the simplicity of my improved instrument, it is further manifest that the device can be constructed and sold at relatively small cost.

While I have herein shown and described the preferred construction and arrangement of the several elements, it is to be understood that the device is susceptible of considerable modification therein and, accordingly, I reserve the privilege of adopting all such legitimate changes as may be fairly embodied within the spirit and scope of the invention as claimed.

I claim:—

1. In an instrument of the character described, a chart having scales thereon extending at right angles to each other from a common junction, a transparent hypotenuse arm pivotally mounted upon the chart adjacent said common junction and having a hair line thereon, the graduations of said scales being extended across the surface of the chart in intersecting relation to each other, and a transparent slide member on said arm having a hair line disposed at right angles to the hair line on the arm and adjustable to register with the intersecting graduation lines, and a protractor connecting the remote portions of said scales, with which the hypotenuse arm coöperates.

2. In an instrument of the character described, a chart having scales thereon extending at right angles to each other and a protractor between said scales, a transparent arm pivotally mounted upon the chart and having a hair line thereon, the graduations of said scales being extended across the surface of the chart in intersecting relation to each other, a transparent slide member on said arm having a hair line disposed at right angles to the hair line on the arm and adjustable to register with the intersecting graduation lines, a second transparent arm longitudinally shiftable upon said first named arm and also having a longitudinally extending hair line thereon, and an adjustable slide member on the second named arm having a hair line extending at right angles to the hair line on said second arm.

3. In an instrument of the character described, a chart having scales thereon extending at right angles to each other and a protractor between said scales, a transparent arm pivotally mounted upon the chart and having a hair line thereon, the graduations of said scales being extended across the surface of the chart in intersecting relation to each other, a transparent slide member on said arm having a hair line disposed at right angles to the hair line on the arm and adjustable to register with the intersecting graduation lines, an additional transparent angle determining arm, a protractor, and means for detachably mounting said latter arm and the protractor upon the first named arm for sliding movement as a unit.

4. In an instrument of the character described, a chart having scales thereon extending at right angles to each other and a protractor between said scales, a transparent arm pivotally mounted upon the chart and having a hair line thereon, the graduations of said scales being extended across the surface of the chart in intersecting relation to each other, a transparent slide member on said arm having a hair line disposed at right angles to the hair line on the arm and adjustable to register with the intersecting graduation lines, an additional slide member detachably engaged upon said arm, a second transparent arm pivotally connected at one of its ends to said slide member, said arm having a longitudinally extending hair line, and a slide on the latter arm having a hair line extending at right angles to the line on said arm.

5. In an instrument of the character described, a chart having scales thereon extending at right angles to each other and a protractor between said scales, a transparent arm pivotally mounted upon the chart and having a hair line thereon, the graduations of said scales being extended across the surface of the chart in intersecting relation to each other, a transparent slide member on said arm having a hair line disposed at right angles to the hair line on the arm and adjustable to register with the intersecting graduation lines, an additional slide member detachably engaged upon said arm, a second transparent arm pivotally connected at one of its ends to said slide member, said arm having a longitudinally extending hair line, a slide on the latter arm having a hair line, extending at right angles to the line on said arm, and a transparent protractor pivotally mounted upon the second named slide member on said first named arm for pivotal movement relative to the second named arm.

6. In a mathematical instrument, a chart provided with scales thereon extending at right angles to each other from a common junction, the graduations of the scales extending across the surface of the chart in intersecting relation to each other, said chart having thereon graduations concentric with the common junction and connecting certain of the graduations of the scales, a hypotenuse arm connected to the junction and being swingingly movable between the scales over and in coöperation with the concentric graduations, said arm having a hair line, a slide adjustably movable on the arm and provided with a hair line adapted to coöperate with the hair line of the arm with the intersecting and interconnecting graduations.

7. In a mathematical instrument, a chart having scales thereon extending at right angles to each other, the graduations of said scales being extended across the surface of the chart in intersecting relation to each other, said chart having additional graduations interconnecting certain of the graduations of the scales, a protractor connecting the remote ends of the scales, a hypotenuse arm fulcrumed upon the chart and being swingingly movable between the scales, a slide adjustably movable on the arm, said slide and the arm being transparent and provided with coöperating hair lines, and a protractor carried movably on said arm, and an additional arm pivotally mounted upon the protractor.

In testimony whereof I hereunto affix my signature in the presence of a witness.

RALPH C. SANBORN.

Witness:
WILLIAM H. OLIVER.

Copies of this patent may be obtained for five cents each, by addressing the "Commissioner of Patents, Washington, D. C."